United States Patent Office 3,031,438
Patented Apr. 24, 1962

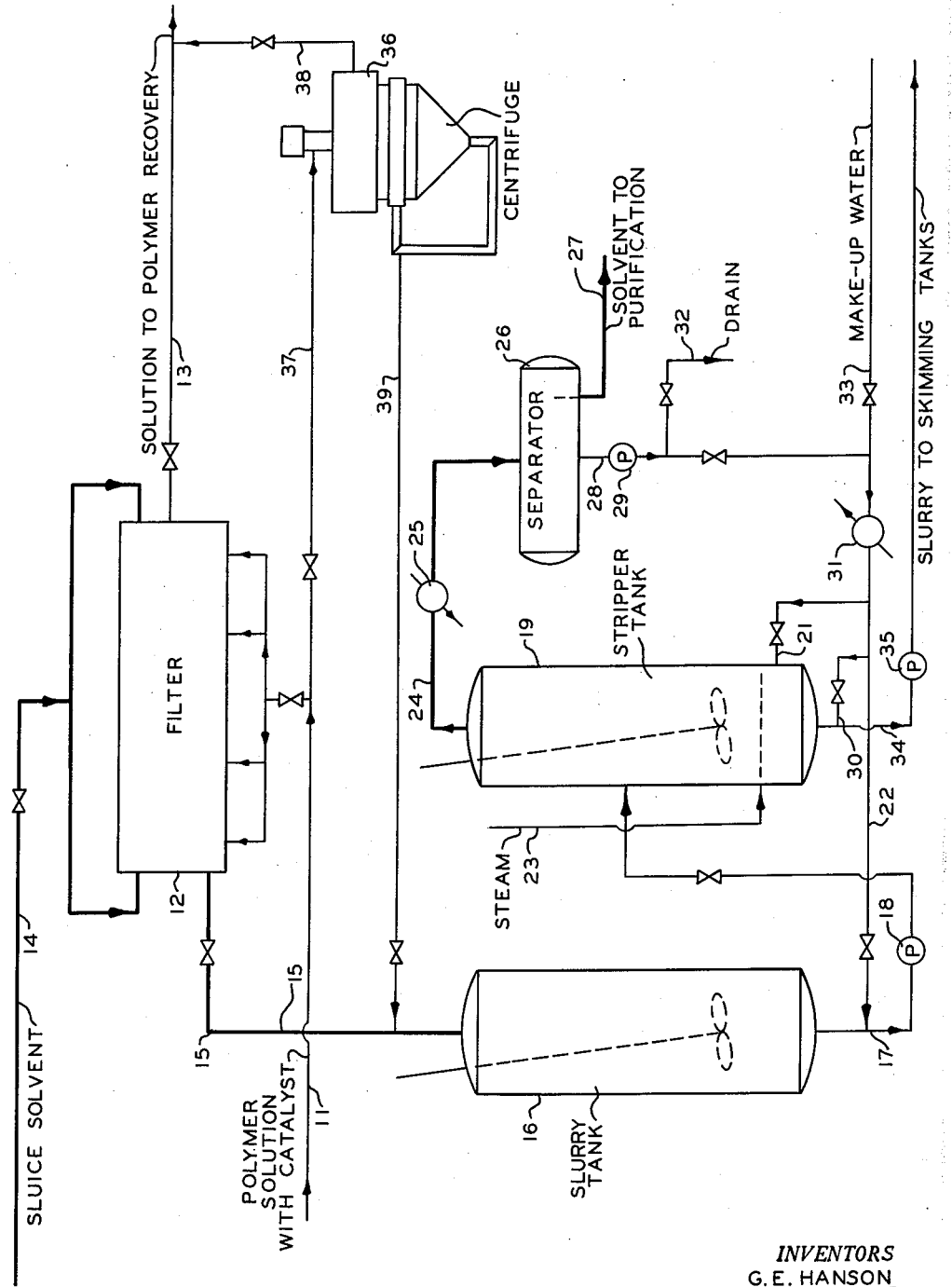

3,031,438
RECOVERY OF SOLVENT FROM OLEFIN POLYMER AND CATALYST
George E. Hanson, Corpus Christi, Tex., and William L. Stalder, Bartlesville, Okla., assignors to Phillips Petroleum Company, a corporation of Delaware
Filed Feb. 23, 1960, Ser. No. 10,509
8 Claims. (Cl. 260—88.2)

This invention relates to a process for recovering organic solvent from a slurry comprising said solvent and finely divided solids with solid or semisolid thermoplastic material in solution or deposited on the particulate solids. In another aspect this invention relates to a method of separating solid catalyst from the effluent stream of a polymerization reaction and recovering solvent used in the separation of said catalyst. In one of its more specific aspects this invention relates to a method of separating hydrocarbon solvent from a slurry of said solvent, catalyst and thermoplastic polymeric material in such a manner that the catalyst and polymeric material does not agglomerate.

This application is a continuation-in-part of the copending application of the same inventors, Serial No. 609,010, filed September 10, 1956, now abandoned.

Many catalytic polymerization processes employ a solvent and a finely divided catalyst dispersed therein in order to effect good contact between the catalyst and the polymerizable material. The reactor effluent from such a polymerization often contains solvent with catalyst dispersed therein, as well as polymer dissolved in the solvent. While not absolutely necessary, it is frequently desirable to separate the catalyst from this solution in order to effect a higher purity and lower ash content in the finished product. Several solids separation methods are applicable; however, the most satisfactory methods are filtration or centrifugation. When a filter is used the catalyst is separated in a filter cake with or without a filter aid, and water-immiscible solvent is normally used to flush this filter cake from the separating equipment. Water could not be used for this purpose because it would necessitate rust-resistant equipment, and in the case of filtration apparatus the presence of water would prevent good pre-coating of the filter media. For these reasons a water-immiscible solvent, such as a hydrocarbon solvent, and preferably the solvent employed in the polymerization process, is used to flush the separation equipment; and this solvent should be recovered for economic reasons, as well as to insure safe disposal of the solids removed. When centrifugation is used the catalyst is separated and flushed from the equipment by part of the process solvent itself, generally diluted to a low polymer content.

In the separation of solvent from such a slurry, several problems are encountered. Some polymer is always present in the slurry, either dissolved in the solvent or disposed on the catalyst; and as solvent is evaporated from the slurry, a viscous mass is formed which besides being very difficult to handle prevents complete removal of the solvent. The viscosity of solutions of high molecular weight polymers increases very rapidly as the concentration of the polymer increases, and in a slurry such as described above, containing catalyst and possibly filter aid, the consistency of the mixture becomes such that it is extremely difficult to remove from the evaporation equipment.

We have discovered a process whereby a volatile, water-immiscible solvent can be satisfactorily separated from a slurry comprising said solvent, solid particulate catalyst, and thermoplastic polymeric material in such a manner that the residue is a catalyst-water slurry which is easily conveyed to suitable disposal or catalyst reactivation. According to our invention, water is mixed with the catalyst-solvent slurry and a good dispersion is formed. Thereafter the mixture is steam distilled with agitation, and the solvent is separated from the water and solvent vapors which are formed in the steam distillation. A water-catalyst slurry remains as residue with polymer deposited on the catalyst or as discrete particles in suspension in the water. There is substantially no tendency for the catalyst or polymer particles to agglomerate, and the slurry can be easily pumped to further processing.

It is an object of this invention to provide a method for recovering solvent from a slurry comprising solvent, finely divided solids and soluble thermoplastic material. It is another object of this invention to provide a method of separating catalyst and polymer from solvent in such a manner that the catalyst can be easily conveyed. It is another object of this invention to provide a method for separating catalyst from the effluent stream of a polymerization reaction and recover the solvents used in said separation. Other objects, advantages and features of this invention will become apparent to those skilled in the art from the following discussion and the drawing which depicts schematically one embodiment of our invention.

Broadly, our invention can be advantageously applied to separate volatile solvent from any system which comprises a mixture of a volatile, water-immiscible solvent, finely divided solids and a tacky solid or semisolid thermoplastic material which is capable of causing agglomeration of the solid particles in the mixture. One of the more specific applications of our invention is the separation of a hydrocarbon solvent from a slurry comprising said solvent, catalyst and thermoplastic polymer. It is of particular advantage in the catalyst recovery operations of such process as the polymerization and copolymerization of polymerizable olefins, especially aliphatic and cyclic olefins, including both mono- and di-olefins, for example, ethylene, butadiene and the like. Among the examples of the preferred class of products of these polymerization reactions are homopolymers of ethylene, propylene, 1-butene, 1-pentene and the like, and copolymers of ethylene with propylene, 1-butene, 2-butene or butadiene and the like. A process for which our invention is particularly applicable is the polymerization of aliphatic 1-olefins with a maximum of 8 carbon atoms per molecule and no branching nearer the double bond than the 4-position, in the presence of a catalyst comprising chromium, a portion of which is hexavalent (preferably at least 0.1 percent by weight of the total catalyst), as chromium oxide associated with at least one oxide from the group consisting of silica, alumina, thoria, and zirconia. The total chromium content is preferably between 0.1 and 10 weight percent. Polymerization is ordinarily carried out at a temperature between 150 and 450° F., although temperatures as low as 80° F. have been found operable. The pressure can vary over a wide range, for example, from atmospheric to 1,000 pounds per square inch absolute or higher. The olefin is usually polymerized in a solvent which is liquid and inert under contacting conditions, preferably a hydrocarbon solvent such as naphthenic hydrocarbons and paraffinic hydrocarbons of from 3 to 12 carbon atoms, for example, propane, normal pentane, isopentane, isooctane, normal hexane, cyclohexane and methylcyclohexane. When such a solvent is employed the pressure of the reaction must be at least sufficient to maintain the solvent in a liquid phase. The effluent withdrawn from the reactor comprises a solution of polymer and unreacted monomer in solvent and when slurry or suspended catalyst is used the solution also contains catalyst. In the process for which our invention is especially applicable the catalyst is in a finely divided state and generally has an average particle size in the range of 1 to 500 microns.

Preparation of such polyolefins is more fully described in the patent of Hogan and Banks, Patent No. 2,825,721, issued March 4, 1958.

Unreacted monomer is removed from the reactor effluent stream and the solution is then processed for the removal of catalyst. Generally, additional solvent is added for this step. One satisfactory method of catalyst removal is by filtration in which the reactor effluent is passed through a batch filter of the rotating leaf type. Filter aid can be used as a pre-coat on the filter members and/or added to the feed slurry to aid in separation of the catalyst particles. At the end of the filtering cycle filter aid and catalyst are flushed from the filtration equipment. Hot solvent of the type employed in the polymerization process is suitable for this operation.

When centrifugation is used the reactor effluent is normally diluted to a low polymer concentration, for example, about 2 weight percent, prior to passing the stream through the centrifuge. The centrifuge overflow stream contains polymer and solvent and is substantially free of catalyst, while the underflow stream from the centrifuge is a slurry of catalyst and solvent with some dissolved polymer. Other methods of solids separation can be used, such as settling, electrical precipitation, flocculation and a variety of other types of filters. Equipment which is suitable for this particular operation is limited, however, because the process is ordinarily carried out under elevated temperatures and pressures. The temperature must be sufficiently high that the polymer does not precipitate from solution and the pressure must be high enough to maintain the solvent in liquid phase.

In most separation processes the catalyst is removed from the separation equipment as a slurry dispersed in the process solvent. This slurry is conveyed to a holding or mix tank which is provided with agitation to maintain the solids present in suspension. The temperature and pressure must be maintained sufficiently high that the polymer does not precipitate prematurely. In this regard, conditions of temperature and pressure in the mix tank should be such that substantially no flashing occurs as a slurry enters the tank. This slurry is then conveyed to a stripping zone wherein water is mixed with the solvent-catalyst slurry so that a good dispersion is formed. Here a steam distillation is carried out, evaporating solvent and water vapors from which solvent is then recovered by condensation and phase separation. In batchwise operation the slurry and stripping tanks can be one and the same. As in the mix tank, above mentioned, extensive flash in this stripping zone is not desirable, and the temperature of the operation must be sufficiently low that polymer precipitated or deposited on the catalyst particles is not melted or caused to become tacky. Generally the temperature range in this operation for the recovery of a cyclohexane solvent from a slurry comprising cyclohexane, polyethylene and a chromium oxide-silica-alumina catalyst is in the range of about 150 to 250° F., preferably from about 170 to 235 F.; for the recovery of a normal hexane-cyclohexane solvent mixture from a slurry comprising normal hexane-cyclohexane, a copolymer of ethylene and 1-butene, and said catalyst, the temperature range may be lower, e.g., 130–230° F.

Sufficient water is added to the stripping zone to provide a good slurry after the solvent has been removed. The agitation must be continuous during the steam distillation and can be provided by mechanical agitation means or by the introduction of steam into the slurry through jets, or the like. As the solvent is evaporated, polymer is precipitated in discrete particles and/or deposited on the catalyst and maintained in suspension. The catalyst-polymer-water slurry which remains as residue from the steam stripping operation is pumped from the stripping zone and can be discarded or processed preparatory to catalyst reactivation.

Referring now to the drawing accompanying this specification, our invention will be discussed further in connection with the embodiment depicted therein. The polymerization effluent from which unreacted monomer has been removed and to which additional solvent has been added to aid in the catalyst separation steps is pumped through line 11 to filter 12 which has been adequately pre-coated with a suitable filter aid such as diatomaceous earth. Additional filter aid is also added to the filter feed. Catalyst particles are deposited on the filter cake of the filter members and polymer solution substantially free of catalyst passes through line 13 to subsequent product recovery operation. A guard filter downstream of filter 12 can be employed if desired. Filter 12 is operated batchwise and the filter cake is removed from the filter by closing the valves in lines 11 and 13, introducing a sluice solvent through line 14 and removing the slurry formed, comprising solvent, catalyst and filter aid, through line 15. Polymer is also present in this slurry since some of the polymer is deposited on the particles of catalyst during the polymerization process. Also, although the filter cake is washed, some polymer solution will remain in the cake and be carried out with the sluice solvent.

The sluice solvent and filter cake solids are passed to surge tank 16 which is provided with suitable agitation to maintain the solids in slurry form. The slurry is then passed through line 17 and pumped by pump 18 into the stripper tank 19. Water can be introduced through line 21 to tank 19 and mixed with the slurry therein. In the preferred embodiment water is used to aid in transferring the slurry to tank 19 by introducing it through line 22 into conduit 17. In this way pump 18 also aids in effecting a good dispersion of solvent and water. Pump 18 may be positioned upstream of the junction of conduits 17 and 22.

Tank 19 is provided with agitation means such as a mechanical impeller or steam jets in combination with steam inlet line 23. When steam is introduced to the stripper tank, steam distillation takes place and vapors of water and solvent pass overhead through line 24 and are condensed by cooler 25. The water and solvent form separate phases in separator 26, and solvent is removed through line 27 and passed to further purification steps. Water from separator 26 is removed through line 28 by pump 29 and is recycled for reuse after having its temperature adjusted, if desired, in heat exchanger 31. Alternatively, some or all of the water can be drained through line 32. Fresh makeup water is added to the system through line 33. Suitable strainers and separators may be provided in line 24 to prevent carry-over of entrained solids to separator 26.

The residue of the stripping operation which comprises water, catalyst, polymer and usually filter aid is removed through line 34 and pumped by pump 35 to suitable disposal or recovery operations. Water can be added to conduit 34 through line 30 to aid in removing the slurry from the stripper tank 19. Centrifuge 36 can be used in conjunction with or in place of filter 12 in which case reactor effluent is introduced through line 37 and centrifugation overflow comprising polymer and solvent passes through line 38 to subsequent polymer recovery operation while centrifugation underflow comprising catalyst and solvent with some polymer passes through line 39 to holding tank 16. The steam stripping operation is essentially the same whether filtration or centrifugation is used.

As a specific embodiment of our invention a solvent recovery operation for an ethylene polymerization employing a cyclohexane solvent and a chromium oxide-silica-alumina catalyst will be discussed. Polymerization is carried out at a temperature of about 280° F. and a pressure of approximately 500 pounds per square inch absolute. The reaction effluent contains about 6 weight percent polyethylene and 0.05 weight percent catalyst having an average particle size of approximately 10 microns. Unreacted ethylene is also present, and this is removed by flashing, following which additional cyclohexane is added to adjust the polyethylene concentration to about 2 weight percent. This solution is then centrifuged and substantially all of the catalyst is removed from the product stream. A slurry comprising catalyst, cyclohexane and dissolved polyethylene is passed from the centrifugation step to a holding tank at approximately 300° F. and 78 pounds per square inch absolute. The slurry is then mixed with water by means of a mixing T in the conduit transferring the slurry to a stripping tank where it is steam distilled at 180° F. and 16 pounds per square inch absolute. Substantially all of the cyclohexane is evaporated in the steam distillation and condensed by cooling the vapors to 155° F. at 15 pounds per square inch absolute. The solvent is recovered by phase separation from the water which is recycled to the stripper tank. The solvent thus recovered is predominantly cyclohexane with small amounts of polyethylene and water which are removed by solvent purification steps prior to reusing the cyclohexane in the process. The residue in the stripper tank is a slurry of catalyst and water with polyethylene deposited on the catalyst and precipitated as discrete particles in the slurry. Stream compositions are shown in Table I, referring to the drawing for line identification.

Table I

| Stream | Drawing Line No. | Stream Composition (Pounds Per Unit of Time) | | | |
|---|---|---|---|---|---|
| | | Catalyst | Cyclohexane | Polyethylene | Water |
| Slurry to Stripper Tank | 17 | 80 | 3,510 | 150 | 7,150 |
| Slurry to Skimming Tanks | 34 | 80 | | 150 | 6,970 |
| Solvent to Purification | 27 | | 3,510 | | 10 |
| Open Steam | 23 | | | | 980 |
| Make Up Water | 33 | | | | 6,000 |

In another embodiment of our invention, a solvent recovery operation will be described for a polymerization wherein an olefin feed comprising 90 percent ethylene and 10 percent 1-butene, a solvent comprising 75 percent normal hexane and 25 percent cyclohexane, and a chromium oxide-silica-alumina catalyst is employed. The polymerization is carried out at a temperature of about 250° F. and a pressure of 300 pounds per square inch absolute. The reaction effluent contains about 5 weight percent copolymer and 0.05 weight percent catalyst. After the separation of unreacted olefins and dilution of the copolymer solution to about 3 percent concentration, the solution is processed through a rotary leaf filter to remove the catalyst particles. In this embodiment the filter members are pre-coated with a filter aid. Additional filter aid is added to the feed during filtration and at the end of the cycle the filter is taken off stream and sluice solvent is introduced to flush catalyst and filter aid from the equipment. The process of our invention is substantially as before. Operating conditions are shown in Table II and stream compositions in Table III.

Table II

| | Pressure (Pounds Per Square Inch Absolute) | Temperature, °F. |
|---|---|---|
| Filter | 150 | 300 |
| Slurry Tank | 78 | 300 |
| Stripper Tank | 16 | 170 |
| Separator | 15 | 130 |
| Stripping Steam | 50 | 281 |
| Recycle Water | 100 | 130 |

Table III

| Stream | Drawing Line No. | Stream Composition (Pounds Per Unit of Time) | | | | |
|---|---|---|---|---|---|---|
| | | Catalyst | Solvent | Polymer | Water | Filter Aid |
| Slurry to Stripper Tank | 17 | 23 | 3,852 | 36 | 11,200 | 245 |
| Slurry to Skimming Tanks | 34 | 23 | | 36 | 11,068 | 245 |
| Solvent to Purification | 27 | | 3,852 | | 10 | |
| Open Steam | 23 | | | | 1,078 | |
| Make Up Water | 33 | | | | 10,000 | |

The specific embodiments discussed above are meant to be examplary only and not to limit our invention unduly.

We claim:

1. In a process for separating particulate catalyst from a reactor effluent comprising normally solid olefinic polymer, catalyst and hydrocarbon solvent having from 3 to 12 carbon atoms per molecule, a method of removing said catalyst from solids separation equipment which comprises removing said catalyst with polymer from said separation equipment as a slurry in hot hydrocarbon solvent having from 3 to 12 carbon atoms per molecule, adding water to said slurry, mixing said water and slurry to effect a good dispersion of solvent and water, thereafter steam distilling solvent therefrom at a temperature sufficiently low that polymer on said catalyst does not soften and cause an agglomeration of catalyst particles, thereby forming a pumpable slurry of water and catalyst, and recovering said hydrocarbon solvent for reuse in the process.

2. In the process for polymerizing olefins in a hydrocarbon solvent having from 3 to 12 carbon atoms per molecule in the presence of a particulate chromium oxide-containing catalyst wherein the polymerization reaction effluent comprises polymer, catalyst and said solvent, a method of separating catalyst from said reaction effluent which comprises passing said effluent through a filter medium thus forming a filter cake comprising catalyst and polymer; flushing said filter cake from said filter medium with hydrocarbon solvent having from 3 to 12 carbon atoms per molecule above the solution temperature of said polymer; forming a slurry of said catalyst and said solvent; adding water to said slurry in an amount sufficient to keep said catalyst and any other solids present in suspension; mixing said water and slurry to effect a good dispersion of said hydrocarbon solvent and water, thereafter steam distilling said hydrocarbon solvent from said slurry at a temperature in the range of about 170 to 235° F.; thus forming vapors of water and said solvent and a pumpable slurry of catalyst and water; condensing said vapors; and separating the condensed water and solvent by phase separation.

3. In a process for polymerizing olefins in a hydrocarbon solvent having from 3 to 12 carbon atoms per molecule in the presence of a particulate chromium oxide-containing catalyst wherein the polymerization reaction effluent comprises polymer, catalyst and said solvent, a method of separating catalyst from said effluent which comprises centrifuging said effluent thus forming a product stream substantially free of catalyst and a catalyst-solvent slurry containing dissolved polymer; adding water to said slurry in an amount sufficient to keep said catalyst and any other solids present in suspension; mixing said water and slurry to effect a good dispersion of said solvent and water, thereafter steam distilling said solvent from said slurry at a temperature in the range of about 170 to 235° F., thus forming vapors of water and solvent and a pumpable slurry of catalyst and water; condensing said vapors; and separating the condensed water and solvent by phase separation.

4. In a process for separating particulate catalyst from a reactor effluent comprising normally solid olefinic polymer, catalyst and hydrocarbon solvent having from 3 to 12 carbon atoms per molecule, a method of removing said catalyst from solids separation equipment which comprises flushing said catalyst from said separation equipment with hot hydrocarbon solvent having from 3 to 12 carbon atoms per molecule, forming a slurry of said hydrocarbon solvent and said catalyst, adding water to said slurry, mixing said water and slurry to effect a good dispersion of solvent and water, thereafter steam distilling solvent therefrom at a temperature sufficiently low that polymer on said catalyst does not soften and cause agglomeration of catalyst particles, thereby forming a pumpable slurry of water and catalyst and recovering said hydrocarbon solvent for reuse in the process.

5. In a process for polymerizing ethylene in a cyclohexene solvent in the presence of a particulate chromium oxide-containing catalyst wherein the polymerization reaction effluent comprises polyethylene, catalyst and cyclohexane, a method of separating catalyst from said reaction effluent which comprises passing said effluent through a filter medium thus forming a filter cake comprising catalyst and polymer; flushing said filter cake from said filter medium with cyclohexane above the solution temperature of said polyethylene; forming a slurry of said catalyst and cyclohexane; adding water to said slurry in an amount sufficient to keep said catalyst and any other solids present in suspension; mixing said water and slurry to effect a good dispersion of cyclohexane and water, thereafter steam distilling said cyclohexane from said slurry at a temperature in the range of about 170 to 235° F.; thus forming vapors of water and cyclohexane and a pumpable slurry of catalyst and water; condensing said vapors; and separating the condensed water and cyclohexane by phase separation.

6. In a process for polymerizing ethylene in a cyclohexane solvent in the presence of a particulate chromium oxide-containing catalyst wherein the polymerization reaction effluent comprises polyethylene, catalyst and cyclohexane, a method of separating catalyst from said effluent which comprises centrifuging said effluent thus forming a product stream substantially free of catalyst and a catalyst-cyclohexane slurry containing dissolved polyethylene, adding water to said slurry in an amount sufficient to keep said catalyst and any other solids present in suspension; mixing said water and slurry to effect a good dispersion of cyclohexane and water, thereafter steam distilling said cyclohexane from said slurry at a temperature in the range of about 170 to 235° F., thus forming vapors of water and cyclohexane and a pumpable slurry of catalyst and water; condensing said vapors; and separating the condensed water and cyclohexane by phase separation.

7. In a process for copolymerizing ethylene and 1-butene in a solvent comprising normal hexane and cyclohexane in the presence of a particulate chromium oxide-containing catalyst wherein the polymerization reaction effluent comprises an ethylene-1-butene copolymer, catalyst and normal hexane-cyclohexane solvent, a method of separating catalyst from said reaction effluent which comprises passing said effluent through a filter medium thus forming a filter cake comprising catalyst and polymer; flushing said filter cake from said filter medium with normal hexane-cyclohexane solvent above the solution temperature of said copolymer; forming a slurry of said catalyst and cyclohexane; adding water to said slurry in an amount sufficient to keep said catalyst and any other solids present in suspension; mixing said water and slurry to effect a good dispersion of normal hexane-cyclohexane solvent and water, thereafter steam distilling said normal hexane-cyclohexane solvent from said slurry at a temperature in the range of about 150 to 235° F., thus forming vapors of water and normal hexane-cyclohexane solvent and a pumpable slurry of catalyst and water; condensing said vapors; and separating the condensed water and normal hexane-cyclohexane by phase separation.

8. In a process for polymerizing olefins in a hydrocarbon solvent having from 3 to 12 carbon atoms per molecule in the presence of a particulate catalyst wherein the polymerization reaction effluent comprises said solvent, said catalyst and a tacky, normally solid, thermoplastic, olefinic polymer predominantly in solution and partially deposited on said catalyst, an improved method of separating said catalyst from the polymer in solution which comprises mixing filter aid with said effluent, passing said effluent through a filter medium thereby forming a filter cake comprising filter aid and catalyst with some polymer and a substantially catalyst-free polymer solution, flushing said filter cake from said filter medium with a water-immiscible hydrocarbon solvent having from 3 to 12 carbon atoms per molecule, thus forming a slurry of said catalyst and filter aid in said water-immiscible solvent at a temperature above the solution temperature of said polymer in said solvent, mixing water with said slurry, thereafter passing steam into said slurry thereby steam distilling overhead vapors of water and said solvent at a temperature below the softening temperature of said polymer, condensing and recovering said solvent, condensing and reusing said water in said mixing step, and agitating said slurry to keep solids in suspension thereby forming a pumpable water slurry of catalyst and filter aid which is easily handled and in which there is substantially no agglomeration of catalyst particles due to cohesion of said tacky polymer deposited thereon.

No references cited.